United States Patent [19]

Brophy et al.

[11] Patent Number: 5,387,668
[45] Date of Patent: Feb. 7, 1995

[54] PROCESS FOR PREPARING POLYKETONES

[75] Inventors: John H. Brophy, Camberley; Neil A. Cooley, Teddington; Michael J. Green, Yateley, all of England

[73] Assignee: BP Chemicals Limited, London, England

[21] Appl. No.: 127,590

[22] Filed: Sep. 28, 1993

[30] Foreign Application Priority Data

Sep. 29, 1992 [GB] United Kingdom ............... 9220502
Oct. 22, 1992 [GB] United Kingdom ............... 9222160
Mar. 19, 1993 [GB] United Kingdom ............... 9305702

[51] Int. Cl.$^6$ ............................................. C08G 67/02
[52] U.S. Cl. ................................. 528/392; 528/271; 556/179
[58] Field of Search ............... 528/392, 271; 556/179, 556/175, 187; 526/352

[56] References Cited

U.S. PATENT DOCUMENTS

| | | | |
|---|---|---|---|
| 4,544,762 | 10/1985 | Kaminsky et al. | 55/179 |
| 4,822,871 | 4/1989 | Klingesmith | 528/392 |
| 4,924,018 | 5/1990 | Bottelberghe | 556/179 |
| 5,034,507 | 7/1991 | Smith | 528/392 |

FOREIGN PATENT DOCUMENTS 0396268 11/1990 European Pat. Off.
0490445 6/1992 European Pat. Off.

Primary Examiner—Nathan M. Nutter
Assistant Examiner—Shelly A. Dodson
Attorney, Agent, or Firm—Brooks Haidt Haffner & Delahunty

[57] ABSTRACT

A process for preparing polyketones by polymerizing a mixture of carbon monoxide and one or more olefins in the presence of a group VIII metal catalyst which is prepared by reacting together:

(a) a source of a group VIII metal, and
(b) an amine, phosphine, arsine or stibine, characterized in that the polymerization is carried out in the presence of a hydrocarbyl aluminoxane is disclosed.

The group VIII metal is preferably palladium. The aluminoxane can be of the formula $[(R^3R^4Al)_2O]_{n''}$ or $[R^5AlO]_{n''+2}$, where $n''$ is 2–40 and $R^3$, $R^4$ and $R^5$ are independently a $C_1$-$C_{20}$ hydrocarbyl group.

16 Claims, No Drawings

PROCESS FOR PREPARING POLYKETONES

The present invention relates to a process for preparing interpolymers of olefins and carbon monoxide by polymerising a mixture of one or more olefins and carbon monoxide in the presence of a group VIII metal, e.g. palladium, catalyst. In particular, the present invention relates to the use of aluminoxanes in such processes.

The preparation of linear interpolymers of olefins and carbon monoxide having the formula:

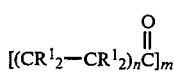

where the $R^1$ groups are independently hydrogen or hydrocarbyl groups, n is at least 1 and m is a large integer, is known from U.S. Pat. No. 3,694,412. Such linear interpolymers especially where n=1, which hereafter will be called polyketones, are prepared according to U.S. Pat. No. 3,694,412 by polymerising a mixture of one or more olefins and carbon monoxide in the presence of an aryl phosphine complex of a palladium halide and an inert solvent. However, the processes described in U.S. Pat. No. 3,694,412 are slow even at elevated temperature and pressure.

An improved version of the process described in U.S. Pat. No. 3,694,412 is described in European patent applications 181014 and 121965. It was found that the rate of the polymerisation process could be increased by using a palladium catalyst with inter alia a bidentate phosphine and the anion of an acid having a pKa of less than 2 (as measured in aqueous solution). Examples of anions which can be used include trichloroacetate, dichloroacetate, tetrafluoroborate, hexafluorophosphate and p-toluene sulphonate, such anions being respectively the conjugate anions of trichloroacetic acid (pKa 0.70), dichloroacetic acid (pKa=1.48), tetrafluoroboric acid, hexafluorophosphoric acid and p-toluenesulphonic acid.

More recently EP 222454 suggests that any acid having a pKa of less than 5 (determined in aqueous solution at 18° C.) can be used.

However, the presence of residual amounts of a strong acid in the final polymer may lead to degradation. The problem to be solved therefore is to eliminate or reduce the possibility of having such residual amounts of strong acid present in the final polymer.

Accordingly, the present invention provides a process for preparing polyketones by polymerising a mixture of carbon monoxide and one or more olefins in the presence of a group VIII metal catalyst which is prepared by reacting together:
(a) a source of a group VIII metal, and
(b) an amine, phosphine, arsine or stibine characterised in that the polymerisation is carried out in the presence of a hydrocarbyl aluminoxane.

The present invention solves the problem by using an aluminoxane and thereby eliminates or reduces the need for the use of a strong acid which may contaminate the final polymer and cause degradation.

Aluminoxanes, which can also be referred to as alumoxanes, are widely disclosed in the prior art; in particular hydrocarbyl aluminoxanes have been extensively studied as active catalysts in the polymerisation of epoxides cf. Colclough, R. O., J.Polym. Sci. 1959, 34, 178, aldehydes cf. Ishida, S. I., J.Polym. Sci. 1962 62,1, and olefins Longiave. C; Castelli, R., J.Polym. Sci. 1963, 4C, 387. Renewed interest in alkyl aluminoxanes was generated in the 1980's primarily from the work of Kaminsky and co-workers who found methylaluminoxane (MAO) to be a highly active cocatalyst for group IV metallocene (e.g. $Cp_2ZrMe_2$) catalysed ethylene and propylene polymerisation. This is set out in U.S. Pat. No. 4,544,762.

For the purposes of the present invention aluminoxanes are a general class of oligomeric compound which comprise at least one hydrocarbyl group and a moiety in which at least two aluminium centres are bridged by an oxo or hydroxo group. Aluminoxanes generally have the generic formula $(R^2AlO)_{n'}$ where $R^2$ is a hydrocarbyl, e.g. alkyl group, and $n \geq 2$.

Typically aluminoxanes are prepared by the controlled hydrolysis of aluminium alkyls. In particular they can be prepared by treating a hydrated aluminium salt for example aluminium sulphate hydrate with the corresponding trialkyl aluminium (the "salt" method). Such a synthesis is disclosed in U.S. Pat. No. 4,544,762; Alternatively the aluminoxanes can be prepared by direct hydrolysis by the addition of water to the appropriate trialkyl aluminium (the "direct hydrolysis" method). In this case the molar ratio of $H_2O$ added to aluminium is in the range 2.0 to 0.5:1 preferably 1.5 to 0.8:1, more preferably 1.2 to 0.9:1 for example 1:1. It is preferred to synthesise the aluminoxane by direct hydrolysis of the appropriate trialkyl aluminium. The aluminoxanes can be prepared as described in published Japanese patent application J02250885-A to Toyo Stauffer Chemicals.

The product of either the "salt" method or the "direct hydrolysis" method will contain an aluminoxane of the formulae

or $[R^5AlO]_{n''+2}$, where n'' is 2–40, and $R^3$, $R^4$ and $R^5$ are the same or different and each is a $C_1$–$C_{20}$ hydrocarbyl, preferably alkyl or aryl, more preferably a $C_2$–$C_6$ alkyl. Particularly preferred are aluminoxanes of the above formulae where the alkyl group or groups $R^3$, $R^4$ and $R^5$ contain β-hydrogens in particular t-butyl; in the above formulae, n''=2–40, preferably n''=2–5 more preferably n''=2. It is preferred that $R^3=R^4$. In addition the product of either the "salt" method or the "direct hydrolysis" method may also contain protonated species in which compounds analogous to those defined herein above comprise hydroxo bridges instead of oxo bridges.

In particular, the aluminoxanes of the present invention will preferably be of the formula

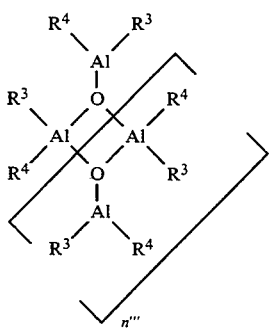

-continued

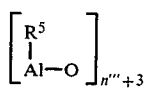

wherein n''' is 1-39, preferably 1-20 more preferably 1-4 and $R^3$, $R^4$ and $R^5$ are the same or different and have the meaning as set out hereinabove. $R^3$, $R^4$ and $R^5$ are preferably t-butyl. The amount of aluminium used in the process can be varied. The molar ratio of Al:Pd will typically be in the range 4,000–10:1, preferably 2,000–100:1 more preferably 500–200:1.

The first component of the catalyst is a group VIII metal which are Fe, Co, Ni, Ru, Rh, Pd, Os, Ir, Pt preferably the Group VIII metal is Ni or Pd but particularly preferred is palladium.

Where the catalyst used in the process described above is a palladium catalyst it is prepared by reacting together a source of palladium, and an appropriate amine, phosphine, arsine or stibine Such a catalyst can be prepared beforehand or generated in situ under the process conditions. As regards the source of palladium this can include simple inorganic and organic salts, e.g. halides, nitrates, carboxylates and the like as well as organometallic and coordination complexes.

Preferably, a palladium complex having strongly bound anions may suitably be used, e.g. palladium acetate or palladium chloride: on reaction with the bidentate amine, phosphine, arsine or stibine, the anions will be retained by the palladium to give a complex such as Pd(dppp)(OAc)$_2$, where dppp is 1,3-bis(diphenylphosphino)propane and OAc is acetate.

The other component of the catalyst is an amine, phosphine, arsine or stibine. The amine, phosphine, arsine or stibine may be monodentate, or chelating e.g. bidentate or tridentate; however it is preferred that the amine, phosphine, arsine, or stibine is bidentate and in particular has the formula $(R^6)_2M—R^7—M(R^6)_2$ where the M atoms are independently selected from nitrogen, phosphorus, arsenic or antimony, preferably phosphorus. The $R^6$ groups are independently selected from alkyl, cycloalkyl or aryl groups with $C_1$ to $C_4$ alkyl and aryl e.g. phenyl groups being preferred. Particularly preferred are substituted aryl groups especially those substituted with a polar substituent e.g. —OMe preferably in the ortho position. The $R^{17}$ group is an alkylene group. In the context of this document alkylene groups are defined as being —(CH$_2$)$_a$(CHR$^8$)$_b$— groups in which the $R^8$ groups are independently hydrogen, methyl, ethyl, propyl, or butyl (e.g. t-butyl) groups and a and b are either zero or integers such that a+b is at least 2, preferably between 2 and 10. Preferably the alkylene group is selected from —(CH$_2$)$_2$—, —(CH$_2$)$_3$—, —(CH$_2$)$_4$— and —(CH$_2$)$_5$—. Of these the most convenient species are the bidentate phosphines, 1,2-bis(diphenylphosphino)ethane (abbreviated to diphos), 1,3-bis(diphenylphosphino)propane (abbreviated to dppp) and 1,4-bis(diphenylphosphino)butane (abbreviated to dppb).

Where the amine, phosphine, arsine or stibine is monodentate, it will suitably have the formula MR$^9$R$^{10}$R$^{11}$ where R$^9$, R$^{10}$, R$^{11}$ are independently a $C_1$–$C_{20}$ preferably $C_1$–$C_{10}$ e.g. $C_2$–$C_6$ alkyl or aryl. Where any of R$^9$, R$^{10}$ or R$^{11}$ is an alkyl it is preferably methyl, ethyl, n-propyl, i-propyl or n-butyl. Where any of $R_2$, $R_3$ or $R_4$ is an aryl group it is preferably a phenyl group optionally substituted with, for example, an alkyl group or alkoxy group. Alternatively, monodentate phosphites, phosphonites, phosphinites can be used. Preferably R$^9$=R$^{10}$=R$^{11}$. A typical triaryl phosphine is triphenyl phosphine.

Considering next the polymerisation feedstock, it is believed that any reasonably pure source of carbon monoxide can be used. Thus the carbon monoxide may contain small amounts of nitrogen, inert gases and up to 10% hydrogen.

Any olefin can in theory be used although the best reaction rates are obtained when $C_2$ to $C_{10}$ alpha-olefins are used especially when either ethylene or a mixture of olefins which include ethylene, e.g. ethylene/propylene, ethylene/butylene and the like, preferably ethylene/propylene are used.

The polymerisation process is suitably carried out in a solvent which is chemically inert under the conditions employed and one in which the catalyst is substantially soluble. Examples of suitable solvents include chlorinated solvents (e.g. CCl$_4$, CHCl$_3$ CH$_2$Cl$_2$), ketones, ethers (e.g. THF, Dioxan) and glycol ethers, aromatic hydrocarbons, e.g. toluene, aliphatic hydrocarbons or any mixture of the above-noted solvents; in particular the reaction may be carried out in liquid olefin where the olefin is a reactant (e.g. propylene). However, it is possible to carry out the reaction in a solvent in which the catalyst is insoluble or only partially soluble e.g. heptane. Alternatively, the polymerisation process can be carried out in the gas-phase e.g. in either a stirred bed or fluidised bed reactor.

The polymerisation process is suitably carried out at a temperature in the range 20 to 150, preferably 50–100 more preferably 60°–80° C., and at elevated pressure (e.g. 1 to 200 preferably 50–100 bars). The overpressure of gas is suitably supplied by the carbon monoxide or carbon monoxide and the olefin, if the olefin is gaseous under the reaction conditions. It is possible to operate the polymerisation process either batchwise or continuously.

The product may suitably be washed to get rid of the aluminoxane e.g. by using acidified methanol or preferably a solvent in which the aluminoxane is soluble e.g. acetone.

The following Examples illustrate the present invention.

EXAMPLE 1

(a) Synthesis of $[(^tBu)_2Al(\mu_2\text{-OH})]_3$

Water (0.97 ml, 54 mmol) was injected into a cooled solution of Al($^t$Bu)$_3$ (10 g, 50.4 mmol) in pentane (300 ml) at −78° C. After stirring for 1.5 hr, the reaction mixture was allowed to warm to room temperature and stirred for an additional two hours. Overnight cooling at −20° C. and filtration yielded $[(^tBu)_2Al(\mu_2\text{-OH})]_3$.

(b) Synthesis of t-butyl aluminoxane

Freshly prepared $[(^tBu)_2Al(\mu_2\text{-OH})]_3$ (1.50 g, 3.16 mmol) was refluxed in hexane (150 ml) for 24 hours to give a clear solution. Heating was discontinued and the volatiles were removed in vacuo to leave a white powder. Toluene was added and the resulting solution filtered to remove traces of insoluble material. The product was shown to be a mixture of two aluminoxanes, the hexamer $[(^tBu)Al(\mu_3\text{-O})]_6$ and the nonamer $[(^tBu)Al(\mu_3\text{-O})]_9$.

EXAMPLE 2

A solution of t-butylaluminoxane in toluene (100 cm$^3$; 0.4 mol dm-3) (as prepared in example 1(b)) was transferred under nitrogen to a 300 cm$^3$ mechanically-stirred autoclave. The reactor was brought to 70° C. and an equimolar mixture of carbon monoxide and ethylene (45 barg) was admitted. A catalyst solution comprising Pd(dppp)(OAc)$_2$ (0.0135 g, 0.02 mmol) in freshly distilled tetrahydrofuran (12 cm$^3$) was added to the reaction mixture and the pressure was adjusted to 50 barg by addition of 1:1 ethylene/carbon monoxide. During the reaction the reactor pressure was maintained at 50 barg by addition of the aforementioned gas mixture. After 5.3 hours the reaction was stopped by simultaneously cooling the reaction mixture and venting the gaseous components. The product solution was treated with a solution of concentrated hydrochloric acid (50 cm$^3$) in methanol (150 cm$^3$). The polymer was collected by filtration, washed with methanol and dried in vacuo. Yield=3.259 g. Average polymerisation rate=272 g gPd$^{-1}$ h$^{-1}$.

Analysis by $^{13}$C NMR spectroscopy established that the product was a linear, alternating carbon monoxide/ethylene polymer of the formula $[(CO)-(C_2H_4)]_n$.

Comparative Test A

Repeating Example 2 with freshly distilled toluene (100cm$^3$) in place of the aluminoxane solution gave no polymer.

EXAMPLE 3

Synthesis of t-butyl aluminoxane

Oxygen free water (16cm$^3$) was injected dropwise into a cooled (−78° C.) vigorously stirred solution of Al($^t$Bu)$_3$ (198 g) in toluene (3000cm$^3$) under an atmosphere of dry argon. After stirring for two hours the reaction mixture was allowed to warm to room temperature and the resulting solution refluxed for two hours to give a clear solution. Heating was discontinued and approximately two thirds of the solvent (and other volatiles) was removed by distillation under atmospheric pressure. Two thirds of the solvent was removed by distillation then the remainder was pumped off under vacuum (ca. 5×10$^{-3}$ mmHg) to leave a white powder which was dried under vacuum, (ca. 5×10$^{-3}$ mmHg) overnight at room temperature. Yield:ca.100 g.

EXAMPLE 4

A solution of t-butylaluminoxane in toluene (100cm$^3$; 0.1 mol cm$^{-3}$) (as prepared in Example 3) was transferred under nitrogen to a 300cm$^3$ mechanically stirred autoclave. The reactor was brought to 70° C. and an equimolar mixture of carbon monoxide and ethylene (30 barg) was admitted. A catalyst solution comprising Pd(dppp)(OAc)$_2$ (0.0145 g, 0.02 mmol) in dry dichloromethane (14cm$^3$) was added to the reaction mixture and the pressure was adjusted to 50 barg by addition of 1:1 ethylene/carbon monoxide. During the reaction the reactor pressure was maintained at 50 barg by addition of the aforementioned gas mixture. After 3.1 hours the reaction was stopped by simultaneously cooling the reaction mixture and venting the gaseous components. The product solution was treated with acetone (50 cm$^3$). The polymer was collected by filtration, washed with acetone (100 cm$^3$) and dried in vacuo. Yield=17.96 g. Average polymerisation rate=2397 g gPd$^{-1}$ h$^{-1}$.

We claim:

1. A process for preparing polyketones by polymerising a mixture of carbon monoxide and one or more olefins in the presence of a group VIII metal catalyst which is prepared by reacting together:
   (a) a source of a group VIII metal, and
   (b) an amine, phosphine, arsine or stibine, characterised in that the polymerisation is carried out in the presence of a hydrocarbyl aluminoxane.

2. A process as claimed in claim 1 wherein the group VIII metal is palladium.

3. A process as claimed in either claim 1 wherein (b) is a phosphine.

4. A process as claimed in claim 3 wherein the phosphine is a bidentate phosphine of the formula (R$^6$)$_2$P—R$^7$—P(R$^6$)$_2$ wherein the R$^6$ groups are independently an alkyl, cycloalkyl or aryl group and R$^7$ is an alkylene group.

5. A process as claimed in claim 1 wherein the hydrocarbyl aluminoxane is a hydrocarbyl aluminoxane of the formulae $\{(R^3R^4Al)_2O\}_{n''}$ or $[R^5AlO]_{n''+2}$, where n″ is 2–40 and R$^3$, R$^4$ and R$^5$ are independently a C$_1$–C$_{20}$ hydrocarbyl group.

6. A process as claimed in claim 5 wherein n″=2–5.

7. A process as claimed in claim 6 wherein n″ is 2.

8. A process as claimed in claim 5 wherein the hydrocarbyl aluminoxane is of the formula.

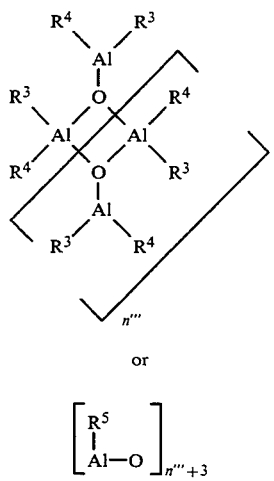

where n‴ is 1–39.

9. A process as claimed in claim 8 wherein n‴ is 1–4.

10. A process as claimed in claim 5 wherein R$^3$=R$^4$=R$^5$.

11. A process as claimed in claim 10 wherein R$^3$, R$^4$ and R$^5$ are each a C$_2$–C$_6$ alkyl.

12. A process as claimed in claim 10 wherein R$^3$, R$^4$ and R$^5$ each have a β-hydrogen.

13. A process as claimed of claim 10 wherein R$^3$, R$^4$ and R$^5$ are each t-butyl.

14. A process as claimed in claim 1 wherein the hydrocarbyl aluminoxane is prepared by direct hydrolysis of a trialkyl aluminium.

15. A process as claimed in claim 1 wherein the amount of hydrocarbyl aluminoxane present is such that the Al:group VIII metal molar ratio is in the range 4000–10:1.

16. A process as claimed in claim 1 wherein the Al:group VIII metal molar ratio is 500–200:1.

* * * * *

UNITED STATES PATENT AND TRADEMARK OFFICE
CERTIFICATE OF CORRECTION

PATENT NO. : 5,387,668
DATED : February 7, 1995
INVENTOR(S) : JOHN H. BROPHY, NEIL A. COOLEY and MICHAEL J. GREEN It is certified that error appears in the above-indentified patent and that said Letters Patent is hereby corrected as shown below:

Col. 3, l. 46, change "$R^{17}$" to --$R^7$--

Signed and Sealed this

Ninth Day of May, 1995

Attest:

BRUCE LEHMAN

Attesting Officer      Commissioner of Patents and Trademarks